(12) United States Patent
Kato et al.

(10) Patent No.: US 7,630,439 B2
(45) Date of Patent: Dec. 8, 2009

(54) APPARATUS FOR CONVERTING CONVERSION ENCODING COEFFICIENTS USING SAMPLING/RESOLUTION CONVERSION

(75) Inventors: Haruhisa Kato, Saitama (JP); Yasuyuki Nakajima, Saitama (JP)

(73) Assignee: KDDI Corporation, Tokyo (JP)

( * ) Notice: Subject to any disclaimer, the term of this patent is extended or adjusted under 35 U.S.C. 154(b) by 873 days.

(21) Appl. No.: 10/863,502

(22) Filed: Jun. 9, 2004

(65) Prior Publication Data

US 2004/0258317 A1 Dec. 23, 2004

(30) Foreign Application Priority Data

Jun. 18, 2003 (JP) ............................. 2003-173774

(51) Int. Cl.
 *H04N 7/12* (2006.01)
(52) U.S. Cl. ............................. 375/240.18; 375/240.21
(58) Field of Classification Search ............... 375/240, 375/240.18
 See application file for complete search history.

(56) References Cited

U.S. PATENT DOCUMENTS

| 5,737,019 A | 4/1998 | Kim |
| 5,926,573 A | 7/1999 | Kim et al. |
| 6,963,606 B1 * | 11/2005 | Yanagihara et al. .... 375/240.01 |

FOREIGN PATENT DOCUMENTS

| EP | 0 786 902 A1 | 7/1997 |
| EP | 0 932 106 A1 | 7/1999 |
| EP | 0 786 902 B1 | 4/2004 |
| JP | 8180194 A | 7/1996 |
| JP | 9233316 A | 9/1997 |
| JP | 11073410 A | 3/1999 |
| JP | 2001-136527 | 5/2001 |
| WO | WO 98/58328 A1 | 12/1998 |
| WO | WO99/23834 * | 5/1999 |

OTHER PUBLICATIONS

Japanese Office Action dated Dec. 19, 2007, issued in corresponding Japanese Patent Application No. 2003-173774.
H. Kato et al., "The Fast Conversion Algorithm from DV to MPEG-2 using DV Coded Data", Technical Report of IEICE, Dec. 2002, vol. 102, No. 518, pp. 75-80.
T. Sano et al., "A study about resizing on the DCT domain accompanying DV-MPEG conversion (D-11-5)", Proceedings of the 2003 IEICE General Conference, Mar. 2002, pp. 5.
H. Kato et al., "The Fast Conversion Algorithm from DV to MPEG-2 using DV Coded Data", Technical Report of IEICE, Dec. 2002, vol. 102, No. 518, pp. 75-80 (partial English language translation).

* cited by examiner

*Primary Examiner*—Y. Lee
*Assistant Examiner*—Richard Torrente
(74) *Attorney, Agent, or Firm*—Westerman, Hattori, Daniels & Adrian, LLP

(57) ABSTRACT

Conversion encoding coefficients which are accumulated in an input memory and read out from the memory is input into converting unit. Conversion matrix integration unit multiplies a basis matrix of conversion encoding coefficient by, arbitrary interpolation matrix or thinning matrix which is input from resolution conversion matrix inputting unit and sampling conversion matrix inputting unit to produce a converting matrix, and outputs the same to the converting unit. Alternatively, the conversion matrix integration unit selects a converting matrix which is previously calculated and stored in the memory, and outputs the same to the converting unit. The converting unit inputs the converting matrix from the conversion matrix integration unit and the conversion encoding coefficients from the input memory, and achieves the resolution conversion and sampling conversion by matrix product computation of the conversion encoding coefficients in row unit.

21 Claims, 3 Drawing Sheets

NUMBER OF ELEMENTS PER BLOCK USED
IN THE CONVERSION
(IMAGE QUALITIES AFTER SAMPLING
CONVERSION AND RESOLUTION CONVERSION)

APPARATUS FOR CONVERTING CONVERSION ENCODING COEFFICIENTS USING SAMPLING/RESOLUTION CONVERSION

BACKGROUND OF THE INVENTION

1. Field of the Invention

The present invention relates to an apparatus using sampling/resolution conversion capable of converting conversion encoding coefficients rapidly and precisely.

2. Description of the Related Art

As one of related arts of this kind, there is a method (first method, hereinafter) in which information is completely decoded and then re-encoded. In this first method, after the encoded information is once decoded completely and is converted from 4:1:1 format into 4:2:0 format for example, resolution thereof is changed and then, the information is re-encoded.

As another related art, there is proposed a method (second method, hereinafter) in which encoding is again utilized as described in Japanese Patent Application Laid-open No.2001-136527. In this second method, after 4×4 element is extracted from coefficients which is encoded in 8×8 unit, it is decoded on the assumption that it is encoded in 4×4 unit, and it is re-encoded to obtain conversion encoding coefficients.

According to the first method, however, it is necessary to completely decode the information and to re-encode the same, and a sampling mode must be further converted. Therefore, there is a problem that an enormous computation amount is required and the processing speed is reduced. There is also a problem that since an enormous amount decoded data must be temporality stored, a large-capacity data region is required.

Since the second method re-utilizes the encoded information, the processing speed is faster than that of the first method. However, since the information is decoded in orthogonal basis different from that used for the conversion encoding, there is a problem that the information is largely deteriorated and sufficient image quality can not be obtained. Further, since the second method is based on the assumption that only pixels are obtained by resolution conversion, it is necessary to separately convert the sampling in a pixel region like the first method.

SUMMARY OF THE INVENTION

It is an object of the present invention to provide an apparatus for converting conversion encoding coefficients using a sampling/resolution conversion capable of rapidly processing, reducing the deterioration of information and enhancing the image quality as compared with the conventional methods.

In order to accomplish the object, the present invention is firstly characterized in that an apparatus for converting conversion encoding coefficients which is converted by orthogonal conversion into conversion encoding coefficients having different size, using sampling/resolution conversion, comprises inputting means for inputting a conversion encoding coefficient converted by the orthogonal conversion, conversion matrix integration means for integrating a sampling conversion matrix required for sampling mode conversion and a resolution conversion matrix required for resolution conversion, and converting means for collectively carrying out the sampling conversion and the resolution conversion using the conversion encoding coefficient input from the inputting means and the conversion matrix obtained from the conversion matrix integration means.

According to this feature, the information encoded using the conversion encoding is directly utilized, while the sampling conversion and the resolution conversion of the conversion encoding coefficient are integrated. Thus, it is possible to convert rapidly as compared with the conventional mode.

The present invention is secondly characterized in that it further comprises low frequency component extracting means which adaptively extracts a low frequency component in accordance with a feature amount of a region from individual conversion encoding coefficient included in conversion processing unit in accordance with an input and output sampling mode and vertical and horizontal resolution conversion magnifications, and wherein the conversion encoding coefficient from the inputting means is input into the low frequency component extracting means, the low frequency component extracted by the low frequency component extracting means is output to the converting means.

According to this feature, it is possible to convert rapidly as compared with the conversional method without deteriorating the image quality.

DETAILED DESCRIPTION OF THE PREFERRED EMBODIMENT

Figure 1:
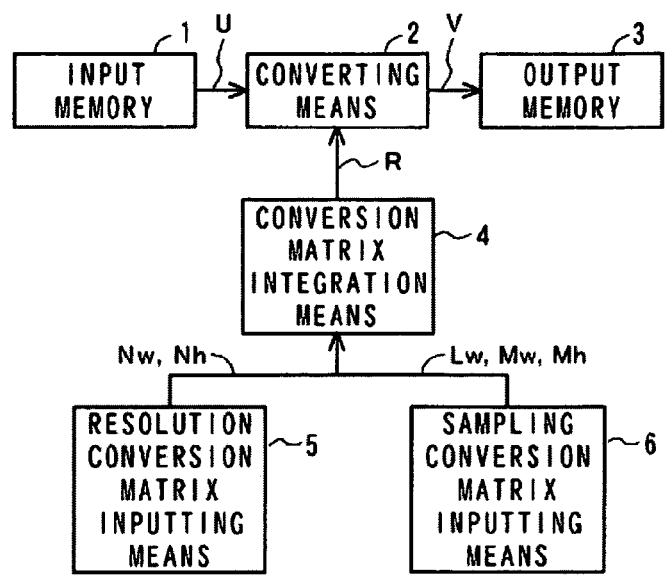
FIG. 1 is a block diagram showing an outline structure of a first embodiment of the present invention.

The present invention will be explained in detail below with reference to the drawings. FIG. 1 is a block diagram showing an outline structure of a first embodiment of the present invention.

In FIG. 1, conversion coefficient information converted by orthogonal conversion is accumulated in an input memory 1 as an input of an entire system. A conversion encoding coefficient read out from the input memory 1 is input to converting means 2. Conversion matrix integration means 4 obtains the product of a basis matrix in a conversion encoding mode, an interpolation matrix or a thinning matrix input from resolution conversion matrix inputting means 5, and an interpolation matrix or a thinning matrix input from sampling conversion matrix inputting means 6, and then outputs the same to the converting means 2. Alternatively, the conversion matrix integration means 4 selects a conversion matrix which is previously calculated and stored in a memory (not shown), and then outputs it to the converting means 2.

The converting means 2 inputs the conversion matrix obtained by the conversion matrix integration means 4 and the conversion encoding coefficients in the input memory 1, and converts resolution and sampling using matrix product computation in row unit of the conversion encoding coefficients.

The conversion encoding information after the resolution conversion and sampling conversion is stored in an output memory 3.

Figure 2:
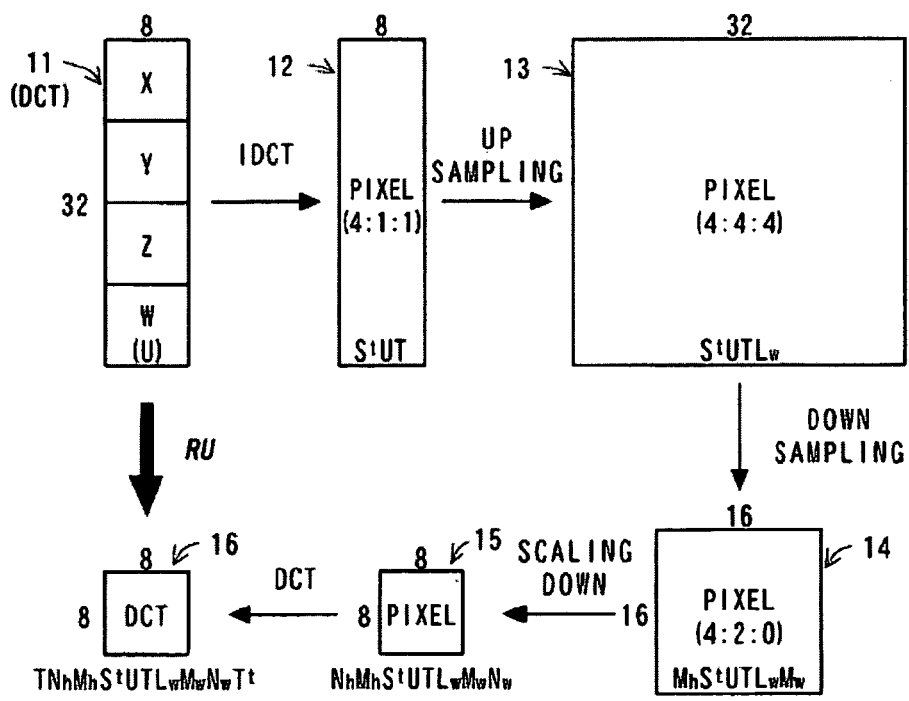
FIG. 2 is an explanatory view of an operation of the first embodiment of the invention.

Next, the operation of this embodiment of the invention will be explained concretely with reference to FIG. 2. FIG. 2 shows scale down processing in a base band, and shows, as one example, a computing process when 8×32 DCT coefficient 11 of 4:1:1 format is converted into 16×16 DCT coefficient 14 of 4:2:0 format and then is scaled down to ½.

Figure 3:
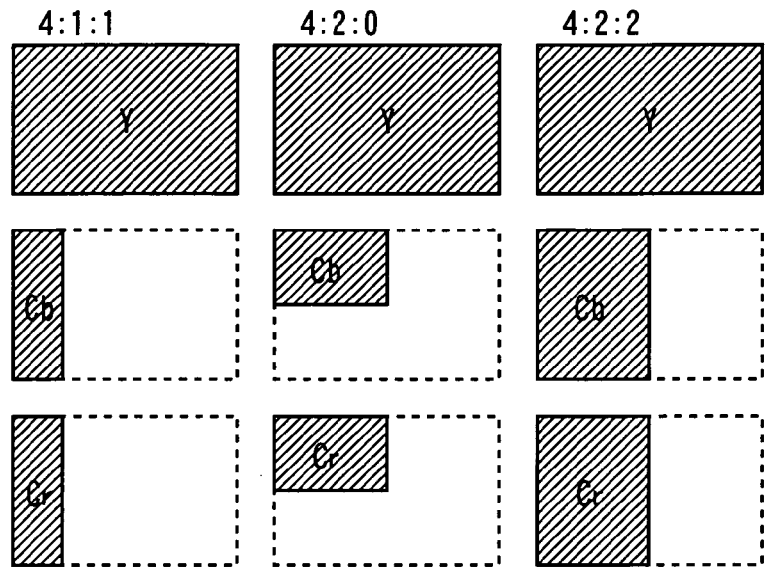
FIG. 3 is an explanatory view of structures of a luminance signal and a color-difference signal of 4:1:1, 4:2:0 and 4:2:2 formats.

First, a configuration of luminance signals and color-difference signals in 4:1:1 format and 4:2:0 format will be explained briefly with reference to FIG. 3. Here, 4:1:1 shows a DV (digital video) format in NTSC, and shows a signal in which the color-difference signal (Cb, Cr) is ¼ sampled in the horizontal direction as compared with the luminance signal (Y). On the other hand, 4:2:0 shows an MPEG format, and shows a signal in which the color-difference signal (Cb, Cr) is ½ sampled in the horizontal and the vertical direction as compared with the luminance signal (Y). Thus, conversion in a sampling mode is required for converting DV of NTSC into MPEG.

In the sampling conversion, since the luminance component is common for both the formats, conversion is not necessary. On the other hand, the color difference component of 4:1:1 format is converted into a color difference component of 4:2:0 format by up sampling in the horizontal direction or down sampling in the vertical direction.

As shown in FIG. 2, four sets of 8×8 DCT coefficients 11 arranged in the vertical direction in the 4:1:1 format which are output from the input memory 1 are expressed as (X, Y, Z, W), and expressed as shown in the following equation (1) as one 32×8 matrix (U):

$$U = \begin{bmatrix} X \\ Y \\ Z \\ W \end{bmatrix} \quad (1)$$

In the computation process shown in FIG. 2, after the four sets of 8×8 DCT coefficient 11 are inversely DCT converted into 4:1:1 pixel value 12, and then is up sampled and sampling converted into 4:4:4 pixel value 13, it is further down sampled and sampling converted into 4:2:0 pixel value 14. Then, the resultant is ½ scaled down into 8×8 pixels and is finally DCT converted into 8×8 size DCT. This computation is expressed in the matrix format as shown in the following equation (2):

$$V = TN_h M_h S^t U T L_w M_w N_w T^{tm} \quad (2)$$

$$S = \begin{bmatrix} T & 0 & 0 & 0 \\ 0 & T & 0 & 0 \\ 0 & 0 & T & 0 \\ 0 & 0 & 0 & T \end{bmatrix} \quad (3)$$

Here, T and t respectively indicates an 8×8 DCT conversion matrix and transpose operation. As shown in the equation (3), S indicates a 32×32 matrix in which four matrixes T are arranged diagonally. Further, $L_w$ indicates an enlarging matrix which enlarges four times in the horizontal direction to obtain the 4:4:4, $M_w$ and $M_h$ indicate ½ scale down matrixes respectively which scale down ½ in the horizontal and vertical direction to obtain 4:2:0, $N_w$ and $N_h$ indicate resolution conversion matrixes. Although the DCT conversion matrix T is fixed, arbitrary interpolation or thinning matrix can be set in the matrixes L, M and N. The computation of the equation (2) is performed by the converting means 2 using data from the conversion matrix integration means 4.

Referring to FIG. 1, the matrix $L_w$ for four times enlarging in the horizontal direction and scale down matrixes $M_w$ and $M_h$ for ½ reducing in the horizontal and vertical direction are input into the conversion matrix integration means 4 from the sampling conversion matrix inputting means 6. From the resolution conversion matrix inputting means 5, the resolution conversion matrixes $N_w$ and $N_h$ are input into the conversion matrix integration means 4.

The resolution conversion matrixes $N_w$ and $N_h$ can be set as shown in the following equations (4) and (5) in the case of two dimensional scale down conversion using the average of adjacent four points:

$$N_h = \frac{1}{2}\begin{bmatrix} 1 & 1 & 0 & 0 & 0 & 0 & 0 & 0 & 0 & 0 & 0 & 0 & 0 & 0 & 0 & 0 \\ 0 & 0 & 1 & 1 & 0 & 0 & 0 & 0 & 0 & 0 & 0 & 0 & 0 & 0 & 0 & 0 \\ 0 & 0 & 0 & 0 & 1 & 1 & 0 & 0 & 0 & 0 & 0 & 0 & 0 & 0 & 0 & 0 \\ 0 & 0 & 0 & 0 & 0 & 0 & 1 & 1 & 0 & 0 & 0 & 0 & 0 & 0 & 0 & 0 \\ 0 & 0 & 0 & 0 & 0 & 0 & 0 & 0 & 1 & 1 & 0 & 0 & 0 & 0 & 0 & 0 \\ 0 & 0 & 0 & 0 & 0 & 0 & 0 & 0 & 0 & 0 & 1 & 1 & 0 & 0 & 0 & 0 \\ 0 & 0 & 0 & 0 & 0 & 0 & 0 & 0 & 0 & 0 & 0 & 0 & 1 & 1 & 0 & 0 \\ 0 & 0 & 0 & 0 & 0 & 0 & 0 & 0 & 0 & 0 & 0 & 0 & 0 & 0 & 1 & 1 \end{bmatrix} \quad (4)$$

$$N_w = N_h^t \quad (5)$$

The equation (4) is a matrix for ½ reducing in the vertical direction, and the equation (5) is a matrix for ½ reducing in the horizontal direction. When the equation (4) and (5) is applied to the equation (2), if it is set such that the product of the matrix $L_w$ for four times enlarging in the horizontal direction and two matrixes $M_w$ and $N_w$ for ½ scaling down become unit matrix E, a matrix $(TL_w M_w N_w T^t)$ applied from right side of the matrix U can be a unit matrix.

On the other hand, if matrixes $M_h$ and $N_h$ applied from left of the DCT conversion matrix U are set to predetermined value, since all the matrixes T, N, M, and S become the constant matrixes, it is possible to reduce the number of computations if they are previously computed and stored. Further, if a plurality of matrixes T, N, M, S suitable for various cases are previously computed and stored and then calculation value which is suitable for the case is selectively read, the number of computations can be reduced.

The present inventor found that when elements $n_{i,j}$ of a resolution conversion matrix $N_w$, i.e., an interpolation matrix or a thinning matrix had properties as shown in the following equation (6), this appeared symmetrical in the product of the constant matrix in the equation (2). Therefore, the properties are introduced into the equation (2).

$$n_{i,j} = n_{x-i-1, y-j-1} \quad (0 \leq i < x, 0 \leq j < y) \quad (6)$$

A matrix which satisfies the equation (6) shows a matrix which is symmetric with respect to a point of a geometric center of the matrix.

Since the matrix $N_h$ in the equation (5) also satisfies the condition of the equation (6), the present inventor calculated the product R (equation (7)) of the constant matrix applied from the left of the matrix U in the equation (2) using the matrix $N_h$ in the equation (5) and a matrix $M_h$ of 16×32 size in which the matrix in the equation (4) is enlarged into 16 elements in the vertical direction and 32 elements in the horizontal direction, and confirmed that the symmetry shown in the equation (8) appeared in the R.

$$R = TN_h M_h \begin{bmatrix} T^t & 0 & 0 & 0 \\ 0 & T^t & 0 & 0 \\ 0 & 0 & T^t & 0 \\ 0 & 0 & 0 & T^t \end{bmatrix} \quad (7)$$

$$= (A\ BHBH\ HAH) \quad (8)$$

Here, A and B show 8×8 partial matrixes shown in the equations (9) and (10), and H shows a matrix in which the 8×8 unit matrixes shown in the equation (11) are inverted in positive and negative every one row. As apparent, absolute values of matrix elements of HBH and HAH in the equation (8) are same as them of matrix elements of B and A, and only symbols are different. If the equation (12) is computed using the equation (8), it is possible to reduce the number of multiplying process by giving higher priority to addition.

$$A = \begin{bmatrix} 0.25 & 0. & 0. & 0. & 0. & 0. & 0. & 0. \\ 0.320364 & 0.0239177 & 0. & -0.00839878 & 0. & 0.00561189 & 0. & -0.00475753 \\ 0.23097 & 0.08669 & 0. & -0.0304415 & 0. & 0.0203403 & 0. & -0.0172437 \\ 0.112497 & 0.164437 & 0. & -0.0577425 & 0. & 0.0385823 & 0. & -0.0327085 \\ 0. & 0.226532 & 0. & -0.0795474 & 0. & 0.0531519 & 0. & -0.04506 \\ -0.0751681 & 0.246097 & 0. & -0.0864177 & 0. & 0.0577425 & 0. & -0.0489517 \\ -0.0956709 & 0.209288 & 0. & -0.0734922 & 0. & 0.0491059 & 0. & -0.04163 \\ -0.0637244 & 0.120242 & 0. & -0.0422235 & 0. & 0.0282129 & 0. & -0.0239177 \end{bmatrix} \quad (9)$$

$$B = \begin{bmatrix} 0.25 & 0. & 0. & 0. & 0. & 0. & 0. & 0. \\ 0.132699 & 0.0577425 & 0. & -0.0202765 & 0. & 0.0135483 & 0. & -0.0114857 \\ -0.23097 & 0.08669 & 0. & -0.0304415 & 0. & 0.0203403 & 0. & -0.0172437 \\ -0.271592 & -0.0681119 & 0. & 0.0239177 & 0. & -0.0159813 & 0. & 0.0135483 \\ 0. & -0.226532 & 0. & 0.0795474 & 0. & -0.0531519 & 0. & 0.04506 \\ 0.181472 & -0.101937 & 0. & 0.0357954 & 0. & -0.0239177 & 0. & 0.0202765 \\ 0.0956709 & 0.209288 & 0. & -0.0734922 & 0. & 0.0491059 & 0. & -0.04163 \\ -0.0263955 & 0.290291 & 0. & -0.101937 & 0. & 0.0681119 & 0. & -0.0577425 \end{bmatrix} \quad (10)$$

$$H = \begin{bmatrix} 1 & 0 & 0 & 0 & 0 & 0 & 0 & 0 \\ 0 & -1 & 0 & 0 & 0 & 0 & 0 & 0 \\ 0 & 0 & 1 & 0 & 0 & 0 & 0 & 0 \\ 0 & 0 & 0 & -1 & 0 & 0 & 0 & 0 \\ 0 & 0 & 0 & 0 & 1 & 0 & 0 & 0 \\ 0 & 0 & 0 & 0 & 0 & -1 & 0 & 0 \\ 0 & 0 & 0 & 0 & 0 & 0 & 1 & 0 \\ 0 & 0 & 0 & 0 & 0 & 0 & 0 & -1 \end{bmatrix} \quad (11)$$

A conversion matrix R in the equation (8) is obtained by integration of a sampling conversion and resolution conversion by the conversion matrix integration means 4 shown in FIG. 1, and the converting means 2 realizes the conversion (U→V) of the conversion encoding coefficients by multiplying 32×8 matrix U by conversion matrix R as shown in the following equation (12). In other words, the converting means 2 can collectively convert the conversion encoding coefficients.

$$V = RU \quad (12)$$

In this embodiment, since the conversion matrix R can directly be obtained from the matrixes A and B, it is only necessary to hold the matrixes A and B in the conversion matrix integration means 4 etc. for storing can be reduced to half.

Next, a second embodiment of the present invention will be explained. In this embodiment, the computation amount is further reduced by utilizing the symmetry of the conversion matrix, and the computation speed of the converting means 2 (see FIG. 1) is increased.

If the equations (1) and (8) are substituted into the equation (12), the following equation (13) can be obtained.

$$V = AX + BY + HBHZ + HAHW \quad (13)$$

Further, if both sides of the equation (13) are multiplied by matrix H from the left and the addition and subtraction are carried out with respect to the equation (13), the resultants will be as shown in the following equations (14) and (15), respectively:

$$(E+H)V = (E+H)A(X+HW) + (E+H)B(Y+HZ) \quad (14)$$

$$(E-H)V = (E-H)A(X-HW) + (E-H)B(Y-HZ) \quad (15)$$

Since (E+H) and (E−H) in the equations (14) and (15) have a want of rank, there exists no reversed matrix. Thus, even if the same (E+H) and (E−H) are multiplied in both sides, they can not be canceled.

If the properties of the (E+H) and (E−H) are taken into account, if they are multiplied from the left, the multiplied matrixes become 0 every one row. That is, since the right sides of the equations (14) and (15) are equal to the matrix V every one row respectively, it is unnecessary to carry out all the calculations. Other rows only may be calculated and thus, the computation amount can be reduced.

If the symmetric between the partial matrixes A and B is taken into account, since the absolute values of the even matrixes of the partial matrixes A and B are equal to each other and the positive and negative signal are reversed every one column, the following equation (16) is established:

$$(E+H)B = J(E+H)AJ \quad (16)$$

Here, J is a matrix in the following equation (17):

$$J = \begin{bmatrix} 1 & 0 & 0 & 0 & 0 & 0 & 0 & 0 \\ 0 & -1 & 0 & 0 & 0 & 0 & 0 & 0 \\ 0 & 0 & -1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & -1 & 0 & 0 \\ 0 & 0 & 0 & 0 & 0 & 0 & -1 & 0 \\ 0 & 0 & 0 & 0 & 0 & 0 & 0 & 1 \end{bmatrix} \quad (17)$$

Thus, if both sides of the equation (14) are multiplied by a matrix J from the left, the addition and subtraction are carried out with respect to the equation (14) and the relation of the equation (16) is utilized, the following equations (18) and (19) are obtained:

$$(E+J)(E+H)V = (E+J)(E+H)A((X+HW) + J(Y+HZ)) \quad (18)$$

$$(E-J)(E+H)V = (E-J)(E+H)A((X+HW) - J(Y+HZ)) \quad (19)$$

The product of (E+J) or (E−J) and an arbitrary matrix also becomes 0 every one row. Thus, in the matrix multiplied by (E+J) (E+H), all rows become 0 except 0th row and 4th row. Similarly, in the matrix multiplied by (E−J)(E+H), all rows become 0 except 2nd row and 6th row. Therefore, 0th and 4th rows of the matrix V are obtained from the equation (18), and 2nd and 6th rows are obtained from the equation (19). Since the symmetry of the partial matrixes A and B appear only in the even rows, odd rows of the matrix V are obtained from the equation (15).

In the equation (13), since each element of the matrix H is 1 or −1, the computation of the HBH and HAH is only needed to reverse the positive and negative symbols of the matrixes B and A, respectively any multiplication is unnecessary. Thus, the equation (13) requires four times matrix products for obtaining the matrix V. That is, multiplication of each of the first to fourth items in the right side of the equation (13) is one time, and the total is four times multiplying process.

In the equations (15), (18) and (19), each element of the matrixes H and J is 1 or −1. Thus, the product of (E+H), (E−H), (E+J), and (E−J) and an arbitrary matrix can be obtained only by replacing the corresponding row by 0, and any multiplication is unnecessary. In the equations (15), (18) and (19), depending upon cases of every row using the product of the (E+H), (E−H), (E+J) and (E−J), multiplication of same elements in the partial matrix is commonly used. Therefore, the total times of the actually required matrix product is reduced to 1.5 times. That is, multiplication of the first item in the right side of the equation (15) is 0.5 times, multiplication of the second item is 0.5 times, and multiplications of the right sides of the equations (18) and (19) are 0.25 times each.

In the partial matrixes A and B, there exists twenty nine 0 elements and one 2 power, and thus, the computation amount required for conversion is largely reduced.

Therefore, according to the embodiment, the operating speed of the converting means 2 can be increased.

Figure 4:
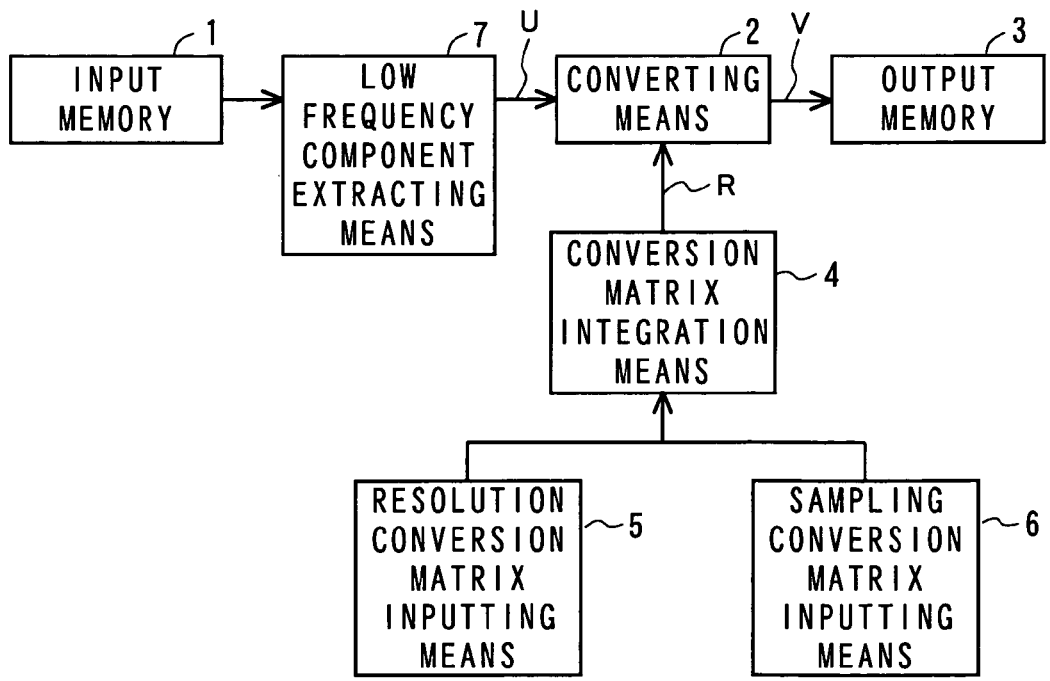
FIG. 4 is a block diagram showing an outline structure of a third embodiment of the invention.

Next, a third embodiment will be explained with reference to FIG. 4. The third embodiment is characterized in that low frequency component extracting means 7 is inserted between the input memory 1 and the converting means 2 shown in FIG. 1. That is, for the four sets of 8×8 DCT coefficient matrix U, the third embodiment is characterized in that high frequency components of their partial matrixes are adaptively set to 0 in accordance with kinds of the sampling conversion and magnification of the resolution conversion, thereby reducing the computation amount. According to the integration conversion mode of the first and second embodiments, the baseband conversions are collected into one matrix product algebraically, and the multiplication times are largely reduced using the partial symmetry of the conversion matrix R. Since this conversion equation is equivalent to the baseband conversion, the image quality is not deteriorated, but if the significance component of the DCT coefficient, i.e., its distribution is concentrated on the low frequency region, it can be considered that sufficient image quality can be obtained without utilizing all the coefficients. This embodiment has been accomplished in view of this fact, and the embodiment provides a method for reducing the high frequency component capable of maintaining the image quality while reducing the computation amount.

Figure 5:
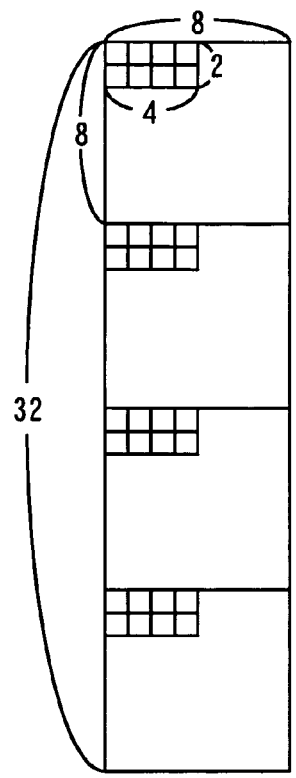
FIG. 5 shows one extracting example of low frequency component extracting means shown in FIG. 4.
Figure 6:
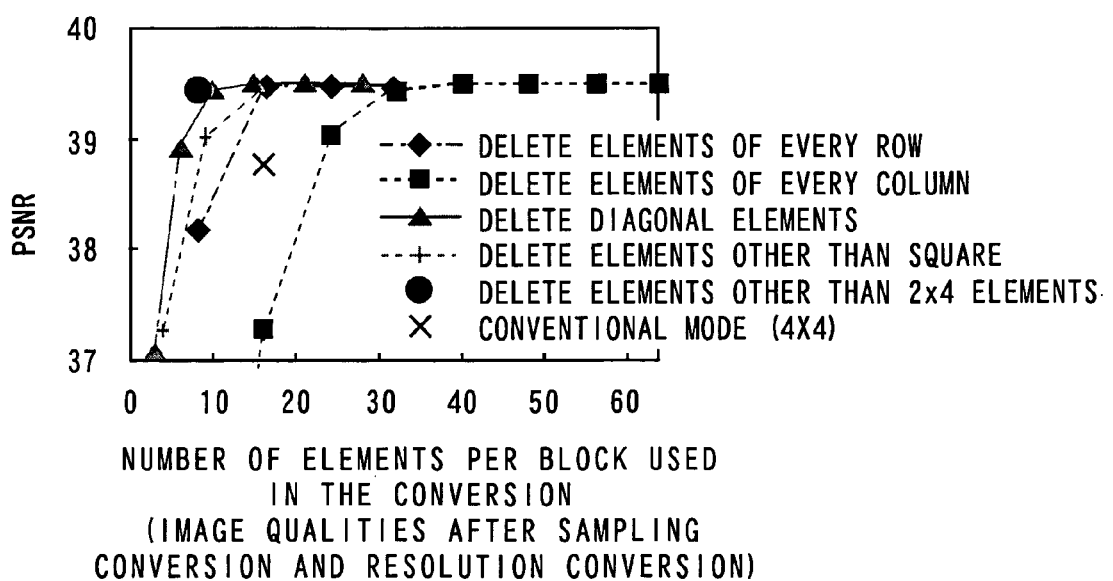
FIG. 6 shows image qualities after sampling conversion and resolution conversion in various deleting methods.

The present inventor experimentally converted DV into MPEG (360×240,30 fps). More specifically, with respect to 8×8 DCT coefficient matrix of four sets of 8×8 DCT coefficient matrixes U as shown in FIG. 5, the following operations were carried out: (1) delete elements of every row, (2) delete elements of every column, (3) delete diagonal elements (a diagonal line from right upper corner to left lower corner), (4) delete elements other than square on the side of low frequency, and (5) delete elements other than 2×4 element on the side of low frequency (see FIG. 5). Then, PSNR was compared. FIG. 6 shows a result thereof. A vertical axis in FIG. 6 shows PSNR, and a lateral axis shows the number of elements per block used in the conversion, and the maximum number is 64.

As apparent from FIG. 6, it is found that even if half of all 64 elements are deleted using any of the methods (1) to (5), the image quality is not deteriorated. In the case of deleting method (2) of every column, if deleted elements exceed half, the deterioration in image quality starts, but in the deleting method (1) of every row, the image quality is maintained if two rows (16 elements) closer to the low frequency are used. In the case of the method (4) in which elements other than square on the side of low frequency are deleted, the image quality is not deteriorated if 4×4 elements or more are remained. In the case of the method (3) for deleting the diagonal direction, even if 10 elements in the low region are deleted, the image quality is not deteriorated almost at all.

However, the present inventor found that the method in which the number of deleted elements is the greatest while maintaining the image quality is the method (5) in which elements other than 2×4 element on the side of low frequency are deleted. The computation in which the sampling conversion and the resolution conversion are integrated can be regarded as conversion for reducing the number of input and output elements into ¼ simply in the vertical direction. Thus, it was considered that in the conversion in the horizontal direction, the interpolation by the sampling conversion and the thinning by the resolution conversion canceled each other and no deformation was caused in the horizontal direction and thus, the deletion of column element deteriorated the image quality. That is, it was considered that individual DCT coefficient to be used for conversion needed to use at least two rows (16 elements), but from the experiment, it was confirmed that the image quality is not affected even if the right half elements (8 elements) of said two rows (16 elements) on the side of high frequency are deleted.

As described above, according to this embodiment, 2×4 element on the side of low frequency of the partial matrix of each of the four sets of 8×8 DCT coefficient matrix U is extracted in the low frequency component extracting means 7, and the computation is carried out using the extracted 2×4 element in the converting means 2 and thus, it is possible to largely reduce the computation amount and to realize high speed computation. The present invention is not limited to the embodiment in which only the 2×4 element on the side of low frequency is extracted in the low frequency component extracting means 7, and 2×m element (m=5, 6, 7) on the side of low frequency may be extracted.

As apparent from the above explanation, according to the present invention, the information encoded using the conversion encoding is directly utilized, the sampling conversion and the resolution conversion of the conversion encoding coefficient are integrated. Thus, it is possible to convert rapidly as compared with the conventional mode without deteriorating the image quality.

Further, since the low frequency component is adaptively extracted from the individual conversion encoding coefficient included in the conversion processing unit in accordance with feature amount of region, it is possible to convert rapidly as compared with the conventional mode without deteriorating the image quality almost at all.

Since this method corresponds to a method in which the conversion encoding coefficient is decoded using the same basis as that used for its encoding, it is possible to enhance the SNR of the conversion encoding coefficient to be output as compared with the conversion mode in which the encoding information is decoded using a different basis from that used for its encoding.

What is claimed is:

1. An apparatus for converting conversion encoding coefficients which is converted by orthogonal into conversion encoding coefficients having different size, using sampling/resolution conversion, comprising;

inputting means for inputting conversion encoding coefficients converted by the orthogonal conversion, conversion matrix integration means for integrating sample conversion matrixes comprised of an enlarging matrix in the horizontal direction (Lw), a scale down matrix in the horizontal direction (Mw), and a conversion matrix in the vertical direction (Mh) required for sampling mode conversion and resolution conversion matrixes comprised of conversion matrixes in the vertical and horizontal direction (Nh, Nw) required for resolution conversion, thereby a first conversion matrix applied from right side of a matrix _(U)_ and a second conversion matrix applied from left side of the matrix _(U)_ are formed, the matrix _(U)_ being made of the conversion encoding coefficients from the inputting means, and converting means for simultaneously carrying out the sampling conversion and the resolution conversion using the matrix _(U)_ of the conversion encoding coefficients input from the inputting means and the first and second conversion matrix obtained from the conversion matrix integration means, wherein a product of the matrixes (Lw) and (Mw) of the sampling conversion matrixes and the matrix (Nw) of the resolution conversion matrix is determined to become a unit matrix (E) in order that the first conversion matrix applied from right side of the matrix (U) becomes the unit matrix.

2. The apparatus for converting the conversion encoding coefficients according to claim 1, further comprising;

low frequency component extracting means which adaptively extracts low frequency components in accordance with a feature amount of a region from individual conversion encoding coefficients included in conversion processing unit in accordance with an input and output sampling mode and vertical and horizontal resolution conversion magnifications, and wherein the conversion encoding coefficients from the inputting means are input into the low frequency component extracting means, and the low frequency components extracted by the low frequency component extracting means are output to the converting means.

3. The apparatus for converting the conversion encoding coefficients according to claim 1, wherein the conversion matrix integration means previously stores, in a memory, a result of calculation of the sampling conversion matrix required for the sampling mode conversion and the resolution conversion matrix required for the resolution conversion, and selects a conversion matrix stored in the memory which is necessary for conversion.

4. The apparatus for converting the conversion encoding coefficients according to claim 2, wherein the conversion matrix integration means previously stores, in a memory, a result of calculation of the sampling conversion matrix required for the sampling mode conversion and the resolution conversion matrix required for the resolution conversion, and selects a conversion matrix stored in the memory which is necessary for conversion.

5. The apparatus for converting the conversion encoding coefficients according to claim 1, wherein the conversion matrix integration means obtains, by calculation, a conversion matrix required for conversion from the input sampling conversion matrix and input resolution conversion matrix.

6. The apparatus for converting the conversion encoding coefficients according to claim 2, wherein the conversion matrix integration means obtains, by calculation, a conversion matrix required for conversion from the input sampling conversion matrix and input resolution conversion matrix.

7. The apparatus for converting the conversion encoding coefficients according to claim 2, wherein the low frequency component extracting means uses distribution or quantized information of the conversion encoding coefficients as the feature amount of the region.

8. The apparatus for converting the conversion encoding coefficients according to claim 3, wherein the conversion matrix integration means can arbitrarily set interpolation or thinning in the horizontal direction and vertical direction caused by the sampling conversion and resolution conversion.

9. The apparatus for converting the conversion encoding coefficients according to claim 4, wherein the conversion matrix integration means can arbitrarily set interpolation or thinning in the horizontal direction and vertical direction caused by the sampling conversion and resolution conversion.

10. The apparatus for converting the conversion encoding coefficients according to claim 3, wherein the conversion matrix integration means stores, therein, a numeric value obtained by previously carrying out a decoding processing which can be obtained by multiplying by a conversion encoding basis matrix, a sampling conversion processing, a resolution conversion processing and a re-coding processing.

11. The apparatus for converting the conversion encoding coefficients according to claim 4, wherein
the conversion matrix integration means stores, therein, a numeric value obtained by previously carrying out a decoding processing which can be obtained by multiplying by a conversion encoding basis matrix, a sampling conversion processing, a resolution conversion processing and a re-coding processing.

12. The apparatus for converting the conversion encoding coefficients according to claim 1, wherein
the converting means carries out the sampling conversion and resolution conversion without decoding the conversion encoding coefficients.

13. The apparatus for converting the conversion encoding coefficients according to claim 2, wherein
the converting means carries out the sampling conversion and resolution conversion without decoding the conversion encoding coefficients.

14. The apparatus for converting the conversion encoding coefficients according to claim 1, wherein
the converting means directly utilizes the conversion encoding coefficients, thereby obtaining conversion encoding coefficients after conversion.

15. The apparatus for converting the conversion encoding coefficients according to claim 2, wherein
the converting means directly utilizes the conversion encoding coefficients, thereby obtaining conversion encoding coefficients after conversion.

16. The apparatus for converting the conversion encoding coefficients according to claim 12, wherein
the converting means classifies input conversion encoding coefficients for every row, and uses different conversion equations for the respective row.

17. The apparatus for converting the conversion encoding coefficients according to claim 14, wherein
the converting means classifies input conversion encoding coefficients for every row, and uses different conversion equations for the respective row.

18. The apparatus for converting the conversion encoding coefficients according to claim 12, wherein
the converting means includes computation means comprising a resolution conversion matrix, a multiplier and an adder, the computation means refers to elements which is not 0 in the resolution conversion matrix for every one row of the input conversion encoding coefficients to obtain a product of the input conversion encoding coefficients, the adder obtains a total value as an output conversion encoding coefficient.

19. The apparatus for converting the conversion encoding coefficients according to claim 14, wherein
the converting means includes computation means comprising a resolution conversion matrix, a multiplier and an adder, the computation means refers to elements which is not 0 in the resolution conversion matrix for every one row of the input conversion encoding coefficients to obtain a product of the input conversion encoding coefficients, the adder obtains a total value as an output conversion encoding coefficient.

20. The apparatus for converting the conversion encoding coefficients according to claim 18, wherein
the converting means temporarily stores calculation process of resolution conversion equation of the conversion encoding coefficient and re-uses the same.

21. The apparatus for converting the conversion encoding coefficients according to claim 18, wherein the converting means includes computation order for reducing the number of multiplication of input conversion encoding coefficients while taking symmetry of a partial aggregation of resolution conversion matrix into account.

* * * * *